United States Patent [19]

Aratani et al.

[11] Patent Number: 4,671,814
[45] Date of Patent: Jun. 9, 1987

[54] METHOD OF STRENGTHENING GLASS ARTICLE FORMED OF FLOAT GLASS BY ION EXCHANGE

[75] Inventors: Shinichi Aratani; Masaaki Katano; Takeshi Mizoguchi, all of Mie, Japan

[73] Assignee: Central Glass Company, Ube, Japan

[21] Appl. No.: 837,131

[22] Filed: Mar. 7, 1986

[30] Foreign Application Priority Data

| Mar. 8, 1985 [JP] | Japan | 60-44926 |
| Mar. 12, 1985 [JP] | Japan | 60-47367 |
| Oct. 29, 1985 [JP] | Japan | 60-240430 |
| Oct. 29, 1985 [JP] | Japan | 60-240431 |

[51] Int. Cl.$^4$ ............................................. C03C 21/00
[52] U.S. Cl. .................................... 65/30.14; 65/99.2; 428/410
[58] Field of Search ............ 65/30.13, 30.14, 99.2, 65/99.4; 428/410

[56] References Cited

U.S. PATENT DOCUMENTS

| 3,453,095 | 7/1969 | Loukes et al. | 65/30 |
| 3,533,888 | 10/1970 | Eppler et al. | 428/410 |
| 3,630,704 | 12/1971 | Garfinkel et al. | 65/3.14 |
| 3,798,013 | 3/1974 | Inoue et al. | 65/3.14 |
| 3,990,877 | 11/1976 | Simmons | 65/30 |

FOREIGN PATENT DOCUMENTS

| 0001957 | 5/1979 | European Pat. Off. | 645/30.14 |
| 54-17765 | 7/1979 | Japan. | |
| 58-115043 | 7/1983 | Japan. | |
| 1094431 | 12/1967 | United Kingdom. | |
| 1249365 | 10/1971 | United Kingdom. | |
| 1317023 | 5/1973 | United Kingdom. | |

Primary Examiner—Robert Lindsay
Attorney, Agent, or Firm—Fleit, Jacobson, Cohn & Price

[57] ABSTRACT

The invention relates to a method of strengthening a glass article formed of sheet glass produced by the float process. The strengthening method includes a known ion exchange treatment to replace alkali metal ions in the surface layers of the glass with, e.g., alkali metal ions larger in ionic radius such as potassium ions. To prevent warping of the glass article during the ion exchange treatment by the influence of a metal element such as tin used as the molten metal in the float process and diffused into one surface of the sheet glass, the glass article is pretreated by contacting at least said surface with an external source of sodium ions and/or lithium ions and heating the glass article together with the external source of the alkali metal ions at 350°-650° C. for 0.01-100 hr. The pretreatment is neither preceded nor followed by grinding or polishing of said surface of the glass. By incorporating the pretreatment, the ion exchange strengthening can be accomplished to a high degree without degrading flatness and surface smoothness of the glass even when the glass thickness is not more than about 3 mm.

14 Claims, 1 Drawing Figure

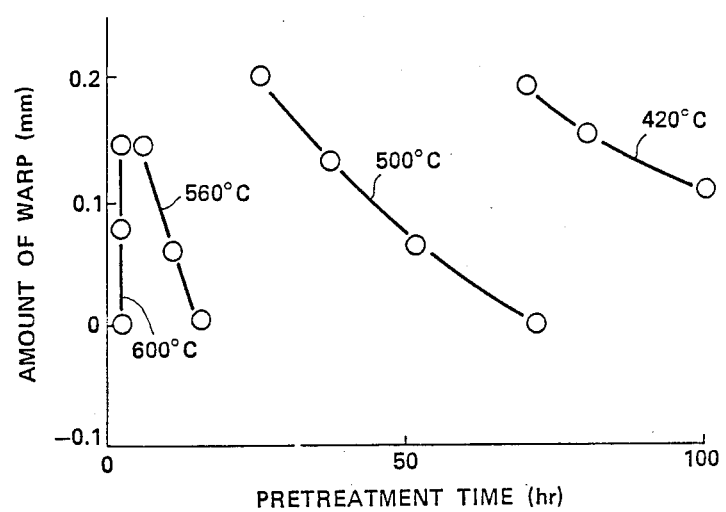

METHOD OF STRENGTHENING GLASS ARTICLE FORMED OF FLOAT GLASS BY ION EXCHANGE

BACKGROUND OF THE INVENTION

In the present application the term "float glass" means sheet glass produced by the float process on the surface of a bath of a molten metal such as molten tin.

The present invention relates to an improved method of chemically strengthening a glass article formed of float glass by using an ion exchange technique and to a strengthened glass article which is obtained by the improved strengthening method and which features high strength and very little warp and retains the excellent surface created on the surface of the molten metal bath.

Float glass has widely been used in buildings and vehicles by reason of excellence in many respects such as flatness, smoothness of surfaces and uniformity of thickness. Furthermore, in recent years applications of float glass to electronic devices and particularly to display devices such as liquid crystal displays and plasma displays are remarkably increasing. Concurrently there is a trend toward preference for employment of thin sheet glass, including float glass, not more than about 3 mm in thickness. As the thickness is reducing, strengthening of sheet glass is acquiring greater importance.

For strengthening thin sheet glass it is usual to use a chemically strengthening method represented by an ion exchange technique since it is difficult to strengthen thin sheet glass by thermal tempering. Conventional ion exchange strengthening methods are classified into two types, viz. low-temperature type ion exchange and high-temperature type ion exchange. In the low-temperature type method, the glass is contacted with a source of alkali metal ions relatively large in ionic radius, such as potassium ions, at a temperature below the transition temperature of the glass to cause exchange of the large alkali metal ions for relatively small alkali metal ions, such as sodium ions, in the glass surfaces. In the high-temperature type method, the glass is contacted with a source of alkali metal ions relatively small in ionic radius, such as lithium ions, at a temperature above the transition temperature of the glass to cause exchange of the small alkali metal ions for relatively large alkali metal ions in the glass surfaces. By either method compressive stresses are induced in the ion-exchanged surface layers of the glass.

In applying an ion exchange strengthening method to float glass, a problem is warp of the strengthened glass article and this problem becomes serious when the glass thickness is small. For example, in the case of a float glass disk about 1 mm in thickness and about 300 mm in diameter the amount of warp of the strengthened disk reaches 0.4–1.3 mm so that flatness of the disk is seriously arred. Though it is wished to use float glass as the substrate material for optical disks or laser disks. the wish has not been met yet by reason of failure to satisfy the flatness requirements of such substrates. For example, in a laser disk of the aforementioned thickness and diameter, the amount of warp or devitation from flatness must be less than 0.2 mm. The principal cause of such warping of float glass by ion exchange strengthening is presumed to be diffusion of tin, or an alternative metal, used as the molten metal in the float process into the glass surface which is in contact with the surface of the molten metal bath. That surface of float glass will be called the originally lower surface, and the opposite surface the originally upper surface. Usually float glass strengthened by ion exchange warps such that the originally upper surface becomes a convex surface.

So far, good measures to cope with the above described warp problem have not been found yet. Therefore, it is necessary to physically grind and polish the originally lower surface of float glass before making an ion exchange treatment where it is important to prevent the strengthened float glass from warping. For example, Japanese patent application primary publication No. 58-115043 (1983), which relates to precise annealing of float glass to be strengthened by ion exchange for the purpose of reducing residual strains, shows the necessity of sand grinding of the annealed glass surfaces before making a low-temperature type ion exchange treatment. However, the surface grinding and polishing treatments are troublesome and involve considerable cost since the depth of the tin-containing surface layer to be ground away reaches 10–20 $\mu$m. Besides, the grinding treatment is liable to cause breaking of the glass or to produce certain defects in the glass, and this becomes serious in the cases of treating thin float glass. Furthermore, the grinding treatment results in vanishment of the excellent glass surface characteristic of float glass. Therefore the surface grinding measure cannot be employed in chemically strengthening float glass to obtain precise articles such as laser disk substrates.

As a glass strengthening method of a different type. U.S. Pat. No. 3,453,095 proposes to introduce tin into the surface layers on both sides of float glass. According to the proposal, which is based on the recognition that tin diffused into the lower surface of float glass from the molten tin bath is in the form of stannous oxide, the upper surface of float glass is treated with stannous oxide vapor such that stannous oxide is present in both the lower and upper surface layers of the glass in nearly equal concentrations. After that the glass is heated under an oxidizing condition to oxidize stannous oxide in the glass to stannic oxide to thereby produce compressive stresses in the tin-containing surface layers. Float glass treated by this method will be fairly good in flatness. However, the compressive stresses produced in the glass surfaces by the conversion of stannous oxide to stannic oxide do not reach desirably high values, so that the treated glass is in many cases insufficient in breaking strength and is not worthy of the term, chemically strengthened glass.

SUMMARY OF THE INVENTION

It is an object of the present invention to provide a method of chemically strengthening a glass article formed of float glass by making an ion exchange treatment without grinding or polishing the originally lower surface of the float glass and without causing significant warp of the strengthened glass article.

Also it is a object of the invention to provide a chemically strengthened glass article formed of float glass, which retains the excellent glass surface characteristic of float glass and is sufficiently high in the compressive stress values at the surfaces and very small in the amount of warp.

The present invention provides a method of chemically strengthening a glass article which is formed of a sheet glass produced by the float process and has a first surface which was in contact with the surface of a molten metal bath used in the float process and a second or opposite surface, the method comprising the steps of (a) contacting at least the first surface of the glass article with an external source of ions of at least one alkali metal selected from the group consisting of Na and Li and heating the glass article together with the external source of alkali metal ions at a temperature in the range from 350° to 650° C. for a time in the range from 0.01 to 100 hr, and (b) strengthening the glass article after the treatment at step (a) by exchange of alkali metal ions present in surface layers of the glass article with different alkali metal ions supplied from an external source with which the glass article is contacted.

In the strengthening method according to the invention the step (b) is a known ion exchange treatment, which may be either the low-temperature type ion exchange or the high-temperature type ion exchange though the former is preferable.

The gist of the invention is the pretreatment at the step (a). This pretreatment has been devised by directing special attention to selective influences of the metal element such as tin diffused into the originally lower surface layer of float glass on the diffusion of alkali metal ions into the same surface layer. For example, in the case of exchanging potassium ions for sodium ions in the surface layers of float glass as an ion exchange strengthening treatment, tin present in the lower surface layer exerts an obstructive influence on the replacement of sodium ions with potassium ions. Therefore, the concentration of potassium ions becomes higher in the upper surface layer. This is the primary cause of warping of the strengthened float glass. We have recognized that tin in float glass exerts a promoting influence on the diffusion of sodium or lithium ions into the originally lower surface layers of the float glass. That is, the pretreatment according to the invention results in that the concentration of, for example. sodium ions becomes higher in the lower surface layer of the pretreated float glass even when the pretreatment is performed by contacting both the originally lower and upper surfaces of the float glass with an external source of sodium ions. When the thus pretreated float glass is subjected to ion exchange treatment using potassium ions, the higher concentration of sodium ions in the lower surface layer compensates for the obstructive influence of tin on the replacement of sodium ions with potassium ions. Therefore, this pretreatment is remarkably effective for suppression of warping of float glass by ion exchange strengthening treatment.

Japanese patent application publication No. 54-17765 (1979) shows a method of strengthening a glass article formed of a thin sheet glass (not mentioned as float glass) by a two-stage ion exchange treatment of the low-temperature type. In the first-stage treatment a mixture of a sodium salt and a potassium salt is used as the external source of alkali metal ions. In the second-stage treatment a potassium salt is used as the external source of alkali metal ions, and the heating temperature is lower than in the first-stage treatment and/or the heating time is shorter than in the first-stage treatment. This method is proposed with a view to shortening the total time of ion exchange treatment for achievement of sufficient strengthening of the glass article and is not concerned with warping of the strengthened glass article. It should be noted that exchange of potassium ions for sodium ions in the glass surfaces already begins at the first-stage treatment. That is, the first-stage treatment does not correspond to the pretreatment, i.e. step (a), in the strengthening method according to the present invention. If the method of this publication is applied to float glass, the first-stage treatment itself will cause warping of the glass article.

The glass article to be strengthened by the method according to the invention may be either a flat float glass sheet or a desirably shaped glass article having curved surfaces. The sole requirement is being formed of and consisting of a float glass. In every case, neither of the originally upper and lower surfaces of the float glass is ground or polished before or after the above described pretreatment.

In the pretreatment, the external source of sodium ions and/or lithium ions comprises an inorganic sodium salt and/or an inorganic lithium salt and may be in the form of molten salt bath. The heating temperature and the duration of heating at the pretreatment should be determined correlatively, because the length of heating time sufficient for accomplishment of the object of the pretreatment becomes shorter as the heating temperature is made higher.

In the glass article strengthened by the method according to the invention the amount of warp is surprisingly small. By performing the pretreatment under an optimum temperature-time condition it is possible to obtain a strengthened glass article in which the amount of warp is nearly equal to that of the unstrengthened glass article or float glass itself. Such a valuable effect can be obtained even when the glass article is formed of a thin float glass not more than 3 mm in thickness and has a relatively large surface area. For example, it is not difficult to limit the amount of warp to about 0.2 mm when strengthening a float glass disk about 1 mm in thickness and about 300 mm in diameter.

The prereatment according to the invention does not adversely affect the efficiency or result of the subsequent ion exchange strengthening treatment whether the pretreatment is made on only the originally lower surface or on both surfaces of the float glass. The glass article strengthened by this method is comparable in the compressive stress values at the both surfaces to the same article strengthened by omitting the pretreatment. Even it is possible to enhance compressive stress values at the surfaces of the strengthened glass article up to about 120 kg/mm$^2$. Flexural strength of the Strengthened glass article becomes about 45–80 kg/mm$^2$. The depth of the ion-exchanged and compressively stressed surface layers becomes about 20–30 $\mu$m.

The originally lower surface of float glass is a sort of fire-polished surface. The strengthening method of the invention does not eliminate or damage this surface. Glass articles strengthened by this method retain all the merits of float glass and are excellent in flatness, smoothness and evenness of surfaces and parallelism of the opposite surfaces and also in precision of shape. Besides. the cost of production is relatively low and the proportion of defective products becomes very small. The present invention is applicable to the manufacture of, for example. relatively wide sections of thin float glass for use in windows of buildings or vehicles, transparent parts of display devices, substrates of electronic devices. photo-mask substrates. laser disk substrates and cooking glassware.

In another aspect, the present invention provides a chemically strengthened glass article which is formed of a sheet glass produced by the float process and retains an original surface created on the surface of a bath of molten metal used in the float process, characterized in that the compressive stress values at the surfaces of the glass article are in the range from 25 to 120 kg/mm$^2$ and that the values of fractional warp in the glass article is in the range from −0.4 to +0.4 μm, wherein the minus sign means that the aforementioned original surface is convex and the plus sign means that the same surface is concave.

This glass article is obtained by the strengthening method according to the invention and possesses the advantages described above with respect to the strengthening method. This glass article may be either a float glass sheet or a desirably shaped article having curved surfaces. A typical example of this glass article is a laser disk substrate. In the case of a shaped glass article. warp of the strengthened glass article refers to deviation from the original shape of the glass article before strengthening.

BRIEF DESCRIPTION OF THE DRAWING

The single FIGURE is a graph showing, as an example. influences of the temperature at the pretreatment of a float glass disk with a molten sodium salt and the duration of the pretreatment on the amount of warp of the glass disk after strengthening by a subsequent ion-exchange treatment with a potassium salt.

DESCRIPTION OF THE PREFERRED EMBODIMENTS

The chemical composition of a float glass for use in the present invention is not particularly limited and may belong to soda-lime-silicate glass, boro-silicate glass or alumino-silicate glass, or to a still different type of glass insofar as it can be formed into sheet glass by the float process. From a practical point of view, the most importance is attached to soda-lime-silicate glass which comprises, on a weight basis, 68–75% $SiO_2$, 10–20% $Na_2O$, 5–15% CaO, 0–5% MgO, 0–5% $Al_2O_3$ and 0–5% $K_2O$ and may further comprise small amounts of optional ingredients such as. for example, $Fe_2O_3$. $As_2O_3$, $TiO_2$ and/or $CeO_2$. Though the thickness of float glass is not limited, the merit of the invention becomes great when the thickness of the employed float glass is not more than about 3 mm and greatest when the thickness is not more than about 2 mm.

In the pretreatment according to the invention, various methods are useful for contacting the both surfaces or only the originally lower surface of the float glass to be subsequently strengthened with a sodium salt and/or a lithium salt. (In the following part of this paragraph, only a sodium salt will be mentioned for brevity.) When it is intended to accomplish the pretreatment while keeping the both surfaces of the float glass in contact with a sodium salt. the pretreatment can be performed by immersing the glass article to be treated in a bath of a molten sodium salt such as sodium nitrate maintained at a predetermined temperature for a predetermined period of time. It is also possible to use the same bath when it is intended to keep only the originally lower surface of the float glass in contact with the sodium salt. In that case the glass article is held such that the originally lower surface lies on and contacts with the surface of the molten salt bath. Another method for the pretreatment has the steps of applying a sodium salt to the both surfaces or to only the originally lower surface of the float glass and then heating the glass article in the atmosphere using a suitable furnace. The application of the sodium salt can be accomplished by immersing the glass article in a bath of molten sodium salt. soon withdrawing the glass article from the bath and cooling the glass article until solidification of the adherent sodium salt. When it is desired to keep only the originally lower surface of the float glass in contact with the sodium salt during the heating. the adherent sodium salt is removed from the opposite surface by, for example, washing with water before starting the heating operation. Alternatively, only the originally lower surface of the float glass is brought into contact with the surface of the molten salt bath and soon removed from the bath. Instead of using a molten salt bath. a sodium salt in the form of either an aqueous solution or a paste may be applied to the desired surface(s) of the float glass, followed by drying to evaporate the liquid of the solution or paste. In this method some additives, e.g. binder in the case of a paste may coexist with the sodium salt applied to the glass. As a still different method. it is possible to use a vapor of a sodium salt.

Examples of sodium salts useful for the pretreatment according to the invention are sodium nitrate, sodium nitrite, sodium sulfate and sodium phosphate. In the cases of using a bath of a molten sodium salt it is suitable to use sodium nitrate or sodium nitrie. In any case it is possible, if desired, to use a mixture of two or more kinds of sodium salts. Examples of lithium salts useful for the same purpose are lithium nitrate. lithium nitrite, lithium sulfate and lithium phosphate. In the cases of using a bath of a molten lithium salt it is suitable to use lithium nitrate or lithium nitrite. In any case it is possible. if desired. to use a mixture of two or more kinds of lithium salts. Though a sodium salt or a lithium salt can alternatively be used in the pretreatment according to the invention, it is preferable to use a sodium salt in the pretreatment when the principal alkali metal in the glass composition is sodium and to use a lithium salt when the principal alkali metal in the glass composition is lithium. It is also possible to use a mixture of a sodium salt or sodium salts and a lithium salt or lithium salts.

In the pretreatment according to the invention the temperature of the molten salt bath or the temperature of the atmosphere in the furnace is set and maintained within the range of from 350° to 650° C., and the duration of the heating in the pretreatment is from 0.01 to 100 hr. As mentioned hereinbefore, the treatment temperature and the treatment time are determined correlatively. If the treatment temperature is below 350° C., effective diffusion of sodium or lithium ions into the glass surface(s) covered with the sodium or lithium salt hardly takes place. The diffusion of sodium or lithium ions into the glass surfaces is promoted by raising the treatment temperature. However, it is unsuitable to employ a treatment temperature above 650° C. because such a high treatment temperature is too close to the softening temnperature of the glass and is liable to cause the treated glass surfaces to have some defects such as haze, waviness and/or distortion. A preferred range of the treatment temperature is from 400° to 600° C. Sufficient diffusion of sodium or lithium ions into the glass surfaces can be accomplished in a relatively short time when the treatment temperature is relatively high. The lower boundary of the range of the treatment time is set at 0.01 hr because if it is intended to accomplish the treatment in less than 0.01 hr the treatment temperature must be made higher than 650 ° C., which is undesirable for the above explained reason. Extension of the treatment time beyond 100 hr is unfavorable from an economical point of view and also because of a possibility of causing undue changes in the state of the treated glass surfaces. A preferred range of the treatment time is from 0.1 to 50 hr.

At the pretreatment according to the invention the glass article may be preheated before contacting the glass surface(s) with a molten sodium or lithium salt. After the pretreatment the heated glass article may be annealed by the employment of a suitable program of cooling such as step cooling. These measures are effective for enhancement of the warp reducing effect of the pretreatment. Before the subsequent ion exchange operation it is desirable to wash the pretreated and cooled glass article to remove the adherent sodium or lithium salt.

After the above described pretreatment the glass article is strengthened by a known ion exchange technique. In the present invention it is preferred to perform the so-called low-temperature type ion exchange using an external source of alkali metal ions relatively large in ionic radius. However, there are some cases where it is also possible or it is suitable to perform the high-temperature type ion exchange using an external source of alkali metal ions relatively small in ionic radius. In the ion exchange operation the external source of alkali metal ions may be used as a molten salt bath. as a paste or as a vapor.

A requirement of a strengthened glass article according to the invention is that the compressive stress values at the ion-exahnged glass surfaces be in the range of from 25° to 120° kg/mm$^2$. If the compressive stress value at the surfaces is below 25 kg/mm$^2$ the glass article will be too low in breaking strength measured by a drop ball test method and also in flexural strength to be actually regarded as a chemically strengthened glass article. On the other hand, various problems arise when it is intended to increase the compressive stress value at the glass surfaces beyond 120° kg/mm$^2$. First, it becomes difficult to limit the amount of warp of the strengthened article within the tolerance limits by the pretreatment according to the invention. Even if the amount of warp is tolerable the excellence of the float glass surface is likely to be marred by the appearance of, for example, haze and waviness. Besides, such a high degree of strengthening is liable to cause a considerable increase in the birefringence of the glass so that the glass article becomes unsuitable for use as a substrate material in some fields of electronic devices. Furthermore, for accomplishment of such a high degree of strengthening often there arises the need of modifying the glass composition to considerably increase a specific ingredient such as $Na_2O$, $Li_2O$ or $ZrO_2$ which makes an important contribution to the creation of the compressive stresses, and such modification of the glass composition often offers difficulty in forming sheet glass by the float process. In the present invention, a preferred range of the compressive stress values at the surfaces of the strengthened glass article is from 30 to 80 kg/mm$^2$.

In each of strengthened glass articles according to the invention the values of fractional warp measured over unit length are limited within the range of from −0.4 to +0.4 μm/cm. In general, glass articles formed of float glass and chemically strengthened have many uses, including the use as substrates of electronic devices. when the values of fractional warp in each article are within this range. The values of fractional warp can be measured with a configuration measuring instrument, DEKTAK II of Sloan Co.. U.S.A. or an equivalent thereto. Instead of actually measuring the values of fractional warp in every region of each glass article, the largest value of fractional warp in that glass article can be found by calculation from the amount of warp. i.e. maximum deviation from flatness or from a standard shape, of that article. That is. the quotient of the maximum amount of warp divided by the square of the representative length of the glass article (e.g. diameter in the case of a disk) is equal to the largest value of fractional warp per centimeter on condition that the figures of the quotient is rounded to one decimal after converting the unit of the quotient to μm. In squaring the length the unit is ignored.) For example. if the glass article is a disk having a diameter of 30 cm and the amount of warp, i.e. maximum deviation from flatness, of the disk is 0.02 cm, the following calculation and conversion are made: 0.02 cm×(1/900)≈0.000022 cm=0.22 μm. By rounding the converted value to one decimal, the largest value of fractional warp in the disk is determined to be 0.2 μm/cm.

Of course it is desirable to render the amount of warp of the strengthened glass article as small as possible. However, too strict setting of the tolerance limits causes an untolerable increase in the proportion of unacceptable products and hence in the production cost. It is preferable that the values of fractional war in each of the strengthened glass articles are within the range of from −0.2 to +0.2 μm/cm, because then the uses of the strengthened glass articles are further expanded to include, for example, the use as substrates of laser disks.

The invention will further be illustrated by the following nonlimitative examples.

EXAMPLE 1

A float glass having a thickness of about 1.0 mm was subjected to chemical strengthening. The glass had the following composition on a weight basis, expressed as oxides and ignoring impurities: 72.30% $SiO_2$, 13.00% $Na_2O$, 7.70% CaO, 3.75% MgO, 1.70% $Al_2O_3$, 1.00% $K_2O$ and 0.10% $Fe_2O_3$. Samples in the form of disk approximately 300 mm in diameter were cut out of the float glass and washed in the usual manner.

The sample disks were immersed in a bath of molten sodium nitrate so as to keep the whole surfaces of each disk in contact with the molten salt. Holders were used to support the glass disks. The bath temperature and the immersion time were correlatively varied as shown in Table 1. The sample disks taken up from the bath were left to cool down and were washed with water to remove adherent sodium nitrate and dried.

After the above treatment with sodium nitrate, all the sample disks were immersed in a bath of molten potassium nitrate at 490° C. for 2.5 hr to stregnthen the glass by replacement of sodium ions in the glass surfaces with potassium ions. Holders were used to support the glass disks. The sample disks taken up from molten potassium were left to cool down, washed and dried. As a reference, glass disk samples not subjected to the pretreatment with sodium nitrate were also strengthened by immersion in the molten potassium nitrate bath under the same condition.

For each of the strengthened glass disks the amount of warp was measured by using a configuration measuring instrument, DEKTAK II of Sloan Co. The same measurement was made also on the disks of the float glass as produced (not strengthened). The results are shown in Table 1 in terms of maximum deviation from flatness of each glass disk. In Table 1 and also in the subsequent Tables, the range of values in each row represents measurements on five samples, and the values with minus sign mean that the originally lower surface of the float glass became convex. The degrees of strengthening of the glass disks were examined by measuring compressive stresses at the ion-exchanged surfaces by using a surface stress measuring instrument supplied from Toshiba Glass Co. The measurements ranged from 20 to 35 kg/mm$^2$ with little difference between the opposite surfaces of each disk and almost irrespective of the temperature-time conditions at the pretreatment with molten sodium nitrate. The depths of the compressively stressed layers were 20-30 μm, which are sufficient to meet the specifications for glass substrates of electronic devices or information storage media. Flexural strength of the strengthened glass disks was measured, by the annular-load bending test method, to be 45-60 kg/mm$^2$.

COMPARATIVE EXAMPLE 1

The float glass disks described in Example 1 were treated with molten sodium nitrate in the same manner as in Example 1 except difference in the bath temperature and immersion time as shown in Table 1. After that the ion exchange operation for chemical strengthening was performed in the same manner and under the same condition as in Example 1. The amounts of warp of the strengthened glass disks were as shown in Table 1.

TABLE I

| Sample | Pretreatment with NaNO$_3$ Temperature (°C.) | Time (hr) | Amount of Warp of Strengthened Glass Disk (300 mm in diameter) (mm) |
|---|---|---|---|
| Ex. 1-A | 600 | 1 | 0.05-0.12 |
| Ex. 1-B | 580 | 3 | 0.06-0.13 |
| Ex. 1-C | 550 | 8 | 0.06-0.12 |
| Ex. 1-D | 530 | 24 | 0.06-0.12 |
| Ex. 1-E | 500 | 48 | 0.06-0.12 |
| Ex. 1-F | 440 | 72 | 0.06-0.13 |
| Reference | — | — | 0.45-1.25 |
| Float Glass as produced | — | — | (−0.02-0.10) |
| Comp. Ex. 1-A | 670 | 1 | −0.10-0.25 |
| Comp. Ex. 1-B | 320 | 100 | 0.30-1.20 |

As mentioned hereinbefore, the warp reducing effect of the pretreatment with a sodium salt and/or a lithium salt depends correlatively on the temperature at the pretreatment and the duration of the pretreatment. In general the duration can be made shorter as the temperature is made higher. In the case of pretreating the aforementioned float glass disks (300 mm in diameter) in a bath of molten sodium nitrate as in Example 1, further experiments revealed that variations in the bath tempeature and immersion time affect the amount of warp of the subsequently strengthened glass disks in the manners as shown in the Figure in the accompanying drawing.

EXAMPLE 2

Sample disks, 300 mm in diameter, of the float glass mentioned in Example 1 were immersed in a bath of molten sodium nitrate maintained at about 390° C. so as to bring the both surfaces of each disk into contact with the molten salt and were soon taken up from the bath. The glass disks were left to cool down until solidification of adherent sodium nitrate. Then sodium nitrate was removed by water spraying from the glass disk surface which was the upper surface when the float glass was produced on a bath of molten tin. The opposite surface of every glass disk was left coated with sodium nitrate. After that the glass disks were subjected to heat treatment in a furnace. The heating temperature and the duration of heat treatment were correlatively varied as shown in Table 2. The treated disks were cooled, washed to remove adherent sodium nitrate and dried.

Following the above treatment the glass disks were chemically strengthened by the same method as in Example 1, i.e. by immersion in a bath of molten potassium nitrate at 490° C. for 2.5 hr. For each of the strengthened glass disks the amount of warp was measured in the same manner as in Example 1. The results are shown in Table 2. The glass disks strengthened in Example 2 were equivalent to the disks strengthened in Example 1 in the depths of the compressively stressed surface layers, in the compressive stress values at the surfaces and also in flexural strength.

COMPARATIVE EXAMPLE 2

The entire process of Example 2 was repeated except that the heating temperature at the heat treatment of the glass disks having a coating of sodium nitrate on the specified surface and the duration of the heat treatment were varied as shown in Table 2. The amounts of warp of the strengthened glass disks were as shown in Table 2

TABLE 2

| Sample | Heat Treatment of Glass Disk having NaNO$_3$ coating Temperature (°C.) | Time (hr) | Amount of Warp of Strengthened Glass Disk (300 mm in diameter) (mm) |
|---|---|---|---|
| Ex. 2-A | 600 | 1 | 0.05-0.13 |
| Ex. 2-B | 580 | 1.5 | 0.06-0.12 |
| Ex. 2-C | 550 | 2 | 0.07-0.12 |
| Ex. 2-D | 500 | 6 | 0.06-0.13 |
| Ex. 2-E | 450 | 16 | 0.08-0.14 |
| Ex. 2-F | 400 | 45 | 0.08-0.14 |
| Reference | — | — | 0.45-1.25 |
| Float Glass as produced | — | — | (−0.05-0.10) |
| Comp. Ex. 2-A | 680 | 1 | −0.20-0.30 |
| Comp. Ex. 2-B | 340 | 48 | 0.40-0.60 |

EXAMPLE 3

The float glass mentioned in Example 1 was cut into approximately 300 mm×300 mm wide square sections as samples to be chemically strengthened. After washing, the glass samples were immersed in a bath of molten lithium nitrate so as to keep the whole surfaces of each sample in contact with the molten salt. The bath temperature and the immersion time were correlatively varied as shown in Table 3. The glass samples taken up from the bath were left to cool down and were washed with water to remove adherent lithium nitrate and dried.

Following the above treatment with lithium nitrate the glass samples were chemically strengthened by the method described in Example 1, i.e. by immersion in a bath of molten potassium nitrate at 490° C. for 2.5 hr. As a reference, glass samples not subjected to the pretreatment with lithium nitrate were also strengthened by the same method. For each of the strengthened flat glass samples the amount of warp was measured in the same manner as in Example 1. The results are shown in Table 3. The glass samples strengthened in Example 3 were equivalent to the samples strengthened in Example 1 in the depths of the compressively stressed surface layers, in the compressive stress values at the surfaces and also in flexural strength.

COMPARATIVE EXAMPLE 3

The entire process of Example 3 was repeated except that the bath temperature and immersion time at the pretreatment with molten lithium nitrate were varied as shown in Table 3. The amounts of warp of the strengthened glass samples were as shown in Table 3.

TABLE 3

| Sample | Pretreatment with LiNO₃ Temperature (°C.) | Time (hr) | Amount of Warp of Strengthened Glass Sheet (300 mm × 300 mm) (mm) |
|---|---|---|---|
| Ex. 3-A | 650 | 0.01 | 0–0.20 |
| Ex. 3-B | 580 | 3 | −0.15–0 |
| Ex. 3-C | 550 | 0.06 | 0–0.20 |
| Ex. 3-D | 500 | 0.10 | 0–0.15 |
| Ex. 3-E | 450 | 0.10 | 0–0.20 |
| Ex. 3-F | 450 | 10 | −0.10–0.10 |
| Ex. 3-G | 400 | 0.2 | 0–0.20 |
| Ex. 3-H | 400 | 40 | −0.05–0.10 |
| Ex. 3-I | 350 | 50 | 0–0.20 |
| Reference | — | — | 0.40–0.65 |
| Float Glass as produced | — | — | (−0.02–0.10) |
| Comp. Ex. 3-A | 670 | 0.008 | 0.15–0.60 |
| Comp. Ex. 3-B | 670 | 55 | −0.90–0.80 |
| Comp. Ex. 3-C | 320 | 0.008 | 0.35–0.60 |
| Comp. Ex. 3-D | 320 | 55 | 0.30–0.60 |

EXAMPLE 4

The 300-mm square samples of the float glass mentioned in Example 3 were immersed in a bath of molten lithium nitrate maintained at about 390° C. so as to bring the both surfaces of each sample into contact with molten lithium nitrate and were soon taken up from the bath. The glass samples were left to cool down until solidification of adherent lithium nitrate Then lithium nitrate was removed by water spraying from the glass sample surface which was the upper surface when the float glass was produced on a bath of molten tin. The opposite surface of every sample was left coated with lithium nitrate. After that the glass samples were subjected to heat treatment in a furnace. The heating temperature and the duration of the heat treatment were correlatively varied as shown in Table 4. The treated samples were cooled. washed to remove adherent lithium nitrate and dried.

After the above treatment the glass samples were chemically strengthened by the same method and under the same condition as in the foregoing examples. The amounts of warp of the strengthened glass samples were as shown in Table 4. The glass samples strengthened in Example 4 were equivalent to the samples strengthened in Example 1 in the depths of the compressively stressed surface layers, in the compressive stress values at the surfaces and also in flexural strength.

COMPARATIVE EXAMPLE 4

The entire process of Example 4 was repeated except that the heating temperature at the heat treatment of the glass samples having a coating of lithium nitrate on the specified surface and the duration of the heat treatment were varied as shown in Table 4. The amounts of warp of the strengthened glass samples were as shown in Table 4.

TABLE 4

| Sample | Heat Treatment of Glass Sheet having LiNO₃ coating Temperature (°C.) | Time (hr) | Amount of Warp of Strengthened Glass Sheet (300 mm × 300 mm) (mm) |
|---|---|---|---|
| Ex. 4-A | 650 | 0.01 | 0–0.20 |
| Ex. 4-B | 580 | 3 | −0.20–0 |
| Ex. 4-C | 550 | 0.06 | 0–0.15 |
| Ex. 4-D | 500 | 0.10 | 0–0.15 |
| Ex. 4-E | 450 | 0.10 | 0–0.20 |
| Ex. 4-F | 450 | 10 | −0.10–0.10 |
| Ex. 4-G | 400 | 0.5 | 0–0.15 |
| Ex. 4-H | 400 | 20 | −0.05–0.15 |
| Ex. 4-I | 380 | 30 | 0–0.20 |
| Reference | — | — | 0.4–0.65 |
| Float Glass as produced | — | — | −0.02–0.10 |
| Comp. Ex. 4-A | 670 | 0.008 | 0.15–0.65 |
| Comp. Ex. 4-B | 670 | 35 | −0.80–0.70 |
| Comp. Ex. 4-C | 350 | 0.008 | 0.40–0.65 |
| Comp. Ex. 4-D | 350 | 35 | 0.30–0.60 |

EXAMPLE 5

A float glass having a thickness of about 1.1 mm was subjected to chemical strengthening. The glass composition was as described in Example 1. Samples of the glass were in the form of disk approximately 300 mm in diameter.

After washing, the glass disks were set in a holder and immersed in a bath of molten sodium nitrate so as to keep the whole surfaces of each disk in contact with the molten salt for about 1 hr. The bath temperature was maintained at about 550° C. The glass disks taken up from the molten salt bath were left to cool down and were washed with water to completely remove adherent sodium nitrate and dried.

Following the above pretreatment, the glass disks were immersed in a bath of molten potassium nitrate maintained at about 490° C. for about 2.5 hr to exchange potassium ions for sodium ions in surface layers of each glass disk to thereby strengthen the glass. The glass disks taken up from the molten salt bath were left to cool down. washed and dried.

For each of the strengthened glass disks. the values of fractional warp were measured with the aforementioned DELTAK II in many regions of the disk. As the result of measurement on all the sample disks, the largest value of fractional warp in each disk ranged from −0.1 to +0.2 μm/cm. In terms of maximum deviation of each disk (300 mm in diameter) from flatness, the amounts of warp of the sample disks ranged from −0.1 to +0.2 mm. The meaning of the minus sign is as described hereinbefore. Compressive stresses at the ion-exchanged surfaces of the strengthened glass disks were measured to be 70–80 kg/mm², and flexural strength of the glass disks was measured to be 50–80 kg/mm² by the annular-load bending test method. By observation under an optical microscope with a magnification of 1100, the surfaces of the strengthened glass disks were almost unchanged from their initial state before the pretreatment with sodium nitrate. The glass disks strengthened in this example could be regarded as almost free of warp and waviness and as excellent in flatness from a practical point of view. Satisfaction was obtained also in mechanical strength and in smoothness of the disk surfaces. Accordingly these disks were practically useful as glass substrates of laser disks for high-precision and high-density storage of information.

As a reference, the sample disks of the float glass mentioned in Example 5 were strengthened by immersion in the molten potassium nitrate bath under the same condition as in Example 5 but without making the pretreatment with molten sodium nitrate. By measurement on the thus strengthened sample disks, the largest value of fractional warp in each disk ranged from 0.65 to 1.2 $\mu$m/cm. In terms of maximum deviation of each disk (300 mm in diameter) from flatness. the amounts of warp of the sample disks ranged from 0.65 to 1.2 mm. In these disks compressive stresses at the ion-exchanged surfaces were measured to be 40-55 kg/mm$^2$, and flexural strength was 30-50 kg/mm$^2$. By microscopic observation the surfaces of the strengthened disks assumed almost the same state as the disks strengthened in Example 5. However, the glass disks strengthened in this reference experiment were unsuitable for use as substrates of laser disks mainly because of large amounts of warp.

EXAMPLE 6

A float glass having a thickness of about 1.3 mm was subjected to chemical strengthening. The glass had the following composition on a weight basis, expressed as oxides and ignoring impurities: 72.40% $SiO_2$, 13.80% $Na_2O$, 8.65% CaO, 4.20% MgO, 0.15% $Al_2O_3$, 0.09% $Fe_2O_3$ and 0.05% $K_2O$. Samples of the float glass were in the form of disk approximately 300 mm in diameter.

After washing, the glass disks were set horizontally in a holder with the originally lower surface of each glass disk down and were slowly brought to a bath of molten sodium nitrate so as to contact the lower surface of each glass disk with the bath surface. The bath temperature was about 500° C. The glass disks were kept in that state for about 5 hr. After withdrawal from the molten salt bath the glass disks were left to cool down, washed with water to remove adherent sodium nitrate and dried.

Following the above pretreatment, the glass disks were strengthened by the same ion exchange operation as in Example 5. By measurement on the strengthened sample disks, the largest value of fractional warp in each disk ranged from $-0.1$ to $+0.2$ $\mu$m/cm. In terms of maximum deviation of each disk (300 mm in diameter) from flatness, the amounts of warp of the sample disks ranged from $-0.1$ to $+0.2$ mm. In these disks compressive stresses at the ion-exchanged surfaces were measured to be 70-90 kg/mm$^2$, and flexural strength was 55-80 kg/mm$^2$. By microscoic observation the both surfaces of the strengthened glass disks were almost unchanged from their initial state before the treatments with molten salts. That is, the strengthened disks were excellent in flatness and surface smootheness and evenness. Accordingly these disks could be used as substrates of laser disks.

It was possible to increase the compressive stress values at the surfaces of the glass disks strengthened by the method of Example 6 up to about 120 kg/mm$^2$ by increasing the amount of $Na_2O$ in the float glass composition to about 15.0 Wt %.

What is claimed is:

1. A method of chemically strengthening a glass article which is formed of a sheet glass produced by the float process and has a first surface which was in contact with the surface of a molten metal bath used in the float process and a second or opposite surface, the method comprising the steps of: (a) contacting at least said first surface of the glass article with an external source of ions of at least one alkali metal selected from the group consisting of Na and Li and which comprises a prncipal alkali metal in the glass composition of the glass sheet, and heating the glass article together with the external source of alkali metal ions at a temperature in the range from 350° to 650° C. for a time in the range from 0.01 to 100 hr; and (b) strengthening the glass article after the treatment at step (a) by exchange of ions of said at least one alkali metal present in surface layers of glass article with ions of another alkali metal, which is different from any of said at least one alkali metal and is larger in ionic radius than the principal alkali metal in the glass composition of the glass sheet, supplied from another external source.

2. A method according to claim 1, wherein said external source at step (a) is a molten salt bath, the treatment of step (a) being performed by keeping the glass article immersed in said molten salt bath so as to contact both said first and second surfaces with the molten salt.

3. A method according to claim 1, wherein step (a) comprises the sub-steps of immersing the glass article in a molten salt bath which comprises said external source in molten state so as to contact both said first and second surfaces with said external source in molten state, soon withdrawing the glass article from said molten salt bath, then cooling the glass article to solidify said external source adherent to the glass article, removing the solidified external source from said second surface of the glass article, heating the glass article at said temperature for said time while said external source is adherent to said first surface.

4. A method according to claim 1. wherein step (a) comprises the sub-steps of introducing the glass article into a molten salt bath which comprises said external source in molten state so as to contact only said first surface with said external source in molten state, soon taking up the glass article from said molten salt bath, heating the glass article at said temperature for said time while said external source is adherent to said first surface.

5. A method according to claim 1, wherein step (a) comprises the sub-steps of contacting at least said first surface of the glass article with an aqueous solution in which said external source is dissolved, drying the glass article so as to leave said external source in solid phase on at least said first surface, thereafter heating the glass article at said temperature for said time.

6. A method according to claim 1, wherein said external source at step (a) is in the form of a vapor.

7. A method according to claim 1, wherein said external source at step (a) comprises a sodium salt selected from the group consisting of sodium nitrate, sodium nitrite, sodium sulfate and sodium phosphate.

8. A method according to claim 1, wherein said external source at step (a) comprises a lithium salt selected from the group consisting of lithium nitrate, lithium nitrite, lithium sulfate and lithium phosphate.

9. A method according to claim 1, wherein said temperature at step (a) is in the range from 400° to 600° C.

10. A method according to claim 9, wherein said temperature at step (a) is in the range from 0.1 to 50 hr.

11. A method according to claim 1, wherein said another alkali metal is potassium.

12. A method according to claim 1, wherein said sheet glass is a soda-lime-silicate glass.

13. A method according to claim 1, wherein the thickness of said sheet glass is not more than 3 mm.

14. A method according to claim 1, wherein the glass article is a glass disk.

* * * * *